(No Model.)
T. C. WOODWARD & C. M. FAIRBANKS.
SEWING MACHINE.
No. 268,346. Patented Nov. 28, 1882.
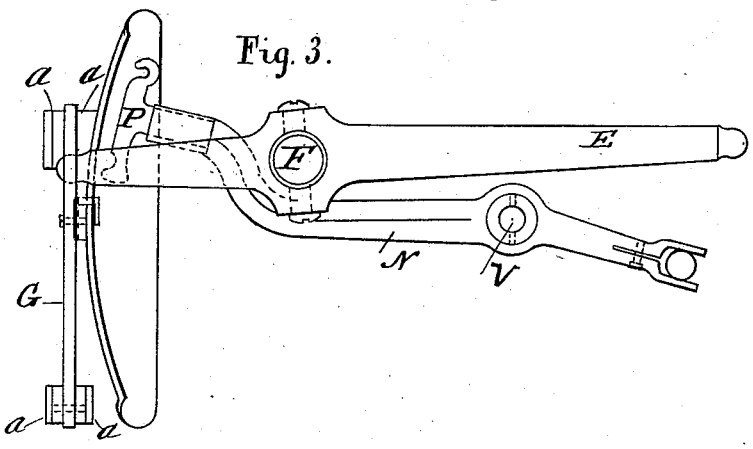
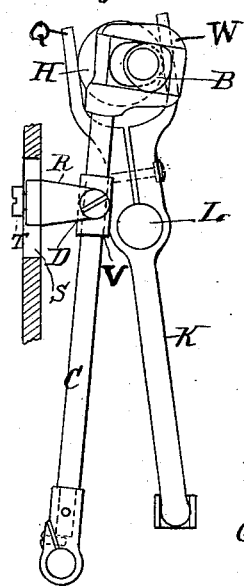
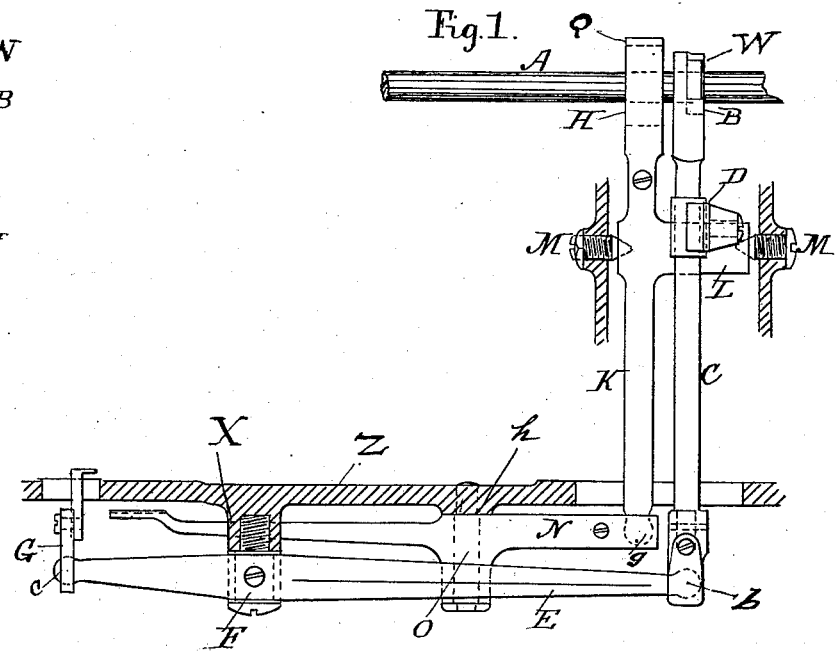
Witnesses:
Emer B. Chadwick
Otto Koch
Inventors
Thomas C. Woodward
Charles M. Fairbanks

UNITED STATES PATENT OFFICE.

THOMAS C. WOODWARD, OF NEW YORK, N. Y., AND CHARLES M. FAIRBANKS, OF HARTFORD, CONNECTICUT, ASSIGNORS TO ELIAS A. WILKINSON, OF NEWARK, NEW JERSEY.

SEWING-MACHINE.

SPECIFICATION forming part of Letters Patent No. 268,346, dated November 28, 1882.

Application filed March 30, 1882. (No model.)

*To all whom it may concern:*

Be it known that we, THOMAS C. WOODWARD, of New York, N. Y., and CHARLES M. FAIRBANKS, of Hartford, Connecticut, have invented a new and useful Improvement in Sewing-Machines, described in this specification and the drawings thereof.

Figure 1 is a side view of one form of the improvement and its connections detached from the other portions of a sewing-machine. Fig. 2 is an end view of a portion of the same. Fig. 3 is an under view of another portion thereof, and Fig. 4 is a detached view of a portion of Fig. 1.

The invention relates to the vertical and horizontal shuttle and feed levers, the shuttle, and the feed, and the actuating-cam and driving-shaft; and it consists principally in combining with a horizontal shuttle-carrying lever (much employed for the accuracy and quietness which it gives to the movements of the shuttle) a horizontal feed-carrying lever, (also much used for the accuracy and quietness which it gives to the movements of the feed,) to give the shuttle backward and forward motions, and to give the feed upward, forward, downward, and backward motions by cam action alone, through vertical levers, without the intervention of a bell-crank or a spring.

It consists, further, in combining therewith certain essentials to the more perfect operation of the devices—as, for example, the much-used one of having one of the feed-levers adjustable to vary the length of the stitch.

In the form of construction shown the main shaft A may be operated by a treadle, driving-wheel, belt, and pulley, or by power in any usual manner. The double cam B on the main shaft A turns in a yoke, W, on the upper end of the vertical feed-lever C, giving it vertical and lateral motions. The fulcrum D of the vertical feed-lever is adjustable by collar V thereon, and an arm, R, and set-screw T through a slot, S, in the arm or frame of the machine. The vertical feed-lever is connected to a horizontal feed-lever, E, by a ball-and-socket joint, *b*, the ball being on the end of the horizontal feed-lever, and the socket in the end of the vertical feed-lever; but they may be the reverse. The vertical feed-lever vibrates from its adjustable fulcrum, and gives vertical and horizontal motions to the horizontal feed-lever, which has a double fulcrum, F, one of which may be made adjustable, supported in a stud, X, on the bed or frames Z, permitting these two motions. The horizontal feed-lever is connected to the feed G by a ball-and-socket joint, *c*, the ball being on the end of the horizontal feed-lever and the socket in the feed. The horizontal feed-lever gives vertical and horizontal motions to the feed, which moves between guides *a* at its ends on the bed or frame of the machine, being free to move vertically and horizontally, one end being slotted to move on a guide-pin, *f*, and both movements being in the same vertical plane, giving to the feed a drop four-motion movement.

The eccentric H on the main shaft turns in a fork or recess, Q, in the upper end of the vertical shuttle-lever K, giving it a lateral motion. The fulcrum L of the vertical shuttle-lever is not adjustable, but is supported on adjustable pointed set-screws M, though it may be otherwise supported. The vertical shuttle-lever is connected to the horizontal shuttle-lever N by a ball-and-fork joint, *g*, the ball being on the end of the vertical lever and the fork on the end of the horizontal lever, though they may be the reverse. The vertical shuttle-lever vibrates from its fulcrum and gives a lateral motion to the horizontal shuttle-lever, which has a fulcrum, O, supported in a stud, *h*, on the bed or frame of the machine. The horizontal shuttle-lever is connected to the shuttle-carrier P rigidly, and moves it backward and forward horizontally, vibrating it in an arc. The vertical and horizontal feed-levers are regulated in their movements by moving the adjustable fulcrum so as to give the proper movement to the feed, and thereby regulate the length of stitch. Either or both levers may be made adjustable for this purpose. The vertical and horizontal shuttle and feed levers may respectively be connected by other means, so as to afford the required freedom of movement, and the connections may be made adjustable to compensate for wear. The vertical and horizontal feed-levers and feed and the vertical and horizontal shuttle-levers and shuttle-carrier are relatively proportioned, located, and formed to insure the proper relative movements of the feed and shuttle in connection with a needle and operating mechanism for the proper formation of stitches.

The fulcrum F of the horizontal feed-lever is located in front of the fulcrum O of the horizontal shuttle-lever, which is curved and bent, as shown, to secure the proper relative movements, and to have the arm of the horizontal feed-lever that carries the feed short, as shown, to give firmness to the movement of the feed in heavy work.

The details of construction and operation may be varied from that shown and described within the scope of the improvement. For example, the horizontal shuttle and feed levers may have their respective fulcrums differently located or on the same stud, and consequently their relative position and form changed; the cam may be made of a single instead of a double piece of metal, so that the projections produce the four motions; the form of the yoke may be varied; the levers may have other forms of fulcrums, supports, and connections, and other minor changes may be made.

Vertical and horizontal feed-levers combined with a feed and operated by an eccentric or cam, and vertical and horizontal shuttle-levers combined with a shuttle-carrier and operated by an eccentric, are respectively not our invention. The former have been combined with a shuttle movement that reciprocates the shuttle at right angles to the feed, and the latter have been combined with a bell-crank feed movement. Vertical and horizontal feed-levers combined with a feed and operated by an eccentric and spring, combined with vertical and horizontal shuttle-levers operated by an eccentric, are respectively, also, not our invention, as such combination does not give the feed four positive successive motions from the action of a cam on the driving-shaft. Each of these old combinations differs materially in construction, operation, and result from that of our improvement.

We claim as our invention—

1. The combination, adapted to sewing mechanism, of a driving-shaft having a shuttle-eccentric and a feed-cam, vertical shuttle and feed levers operated respectively thereby, horizontal shuttle and feed levers operated by the respective vertical levers, and a shuttle-carrier and a feed operated by the respective horizontal levers, the shuttle-carrier having a vibrating lateral motion, and the feed having a compound vertical and lateral motion, constituting a four-motion feed, the compound motion of the feed being produced from the cam alone, substantially as set forth.

2. The combination, in sewing mechanism, of a driving-shaft having a shuttle-eccentric and a feed-cam, vertical and horizontal shuttle and feed levers, one of the feed-levers having an adjustable fulcrum, a shuttle-carrier, and a feed, the shuttle having a vibrating lateral motion, and the feed having a vertical and lateral four-motion produced from the cam alone, substantially as set forth.

3. The combination, in sewing mechanism, of a driving-shaft having a shuttle-eccentric and a feed-cam, vertical and horizontal shuttle and feed levers, the horizontal levers having separate fulcrums, a shuttle-carrier, and a feed, the shuttle-carrier having a vibrating motion from the eccentric alone, and the feed having up, forward, down, and back motions from the cam alone, substantially as set forth.

4. The combination, in sewing mechanism, of a driving-shaft having a shuttle-eccentric and a double feed cam, vertical and horizontal shuttle and feed levers, one of the feed-levers having an adjustable fulcrum, the horizontal feed and shuttle levers having separate fulcrums, a shuttle-carrier, and feed, the shuttle-carrier having a vibrating motion from the eccentric, and the feed having a substantially rectangular motion from the cam, substantially as set forth.

5. The combination, in a sewing-machine, of a driving-shaft, an eccentric thereon for giving motion to the shuttle, a forked vertical shuttle-lever embracing the eccentric, a horizontal shuttle-lever connected with the forked vertical shuttle-lever, a shuttle-carrier connected to the horizontal shuttle-lever, a double cam on the driving-shaft for giving four motions to the feed, a vertical feed-lever having a yoke embracing the double cam and having an adjustable fulcrum, a horizontal feed-lever connected to the vertical feed-lever, a feed connected to the horizontal feed-lever, the horizontal feed and shuttle levers having separate fulcrums, the shuttle being vibrated from the eccentric, and the feed being operated from the cam alone, substantially as set forth.

In testimony whereof we hereunto subscribe our signatures and affix our seals in the presence of two attesting witnesses.

THOMAS C. WOODWARD. [L. S.]
CHARLES M. FAIRBANKS. [L. S.]

Witnesses:
EMERY B. CHADWICK,
OTTO KOCH.